US008039557B2

(12) United States Patent
Longo et al.

(10) Patent No.: US 8,039,557 B2
(45) Date of Patent: Oct. 18, 2011

(54) PROCESS FOR THE PREPARATION OF VINYLAROMATIC (CO)POLYMERS GRAFTED ON AN ELASTOMER IN A CONTROLLED WAY

(75) Inventors: Aldo Longo, Mantova (IT); Leonardo Chiezzi, Follonica-Grosseto (IT)

(73) Assignee: Polimeri Europa S.p.A., Brindisi (IT)

( * ) Notice: Subject to any disclaimer, the term of this patent is extended or adjusted under 35 U.S.C. 154(b) by 681 days.

(21) Appl. No.: 11/578,412

(22) PCT Filed: Mar. 7, 2005

(86) PCT No.: PCT/EP2005/002470
§ 371 (c)(1),
(2), (4) Date: Jan. 19, 2007

(87) PCT Pub. No.: WO2005/100425
PCT Pub. Date: Oct. 27, 2005

(65) Prior Publication Data
US 2007/0213469 A1    Sep. 13, 2007

(30) Foreign Application Priority Data

Apr. 16, 2004 (IT) .............................. MI2004A0752

(51) Int. Cl.
*C08F 279/02* (2006.01)
(52) U.S. Cl. ........ 525/259; 525/240; 525/241; 525/242; 525/243; 525/256; 525/313; 525/902; 526/204
(58) Field of Classification Search .................. 525/240, 525/242, 256, 241, 243, 259, 313, 902; 526/204
See application file for complete search history.

(56) References Cited

U.S. PATENT DOCUMENTS

| 3,862,105 | A | | 1/1975 | Lachowicz et al. | |
|---|---|---|---|---|---|
| 4,581,429 | A | | 4/1986 | Solomon et al. | |
| 5,166,260 | A | * | 11/1992 | Buonerba et al. | 525/52 |
| 5,721,320 | A | * | 2/1998 | Priddy et al. | 525/316 |
| 5,942,575 | A | * | 8/1999 | Monti et al. | 525/52 |
| 6,255,402 | B1 | * | 7/2001 | Boutillier et al. | 525/316 |
| 6,262,179 | B1 | * | 7/2001 | Nicol | 525/192 |
| 6,815,500 | B1 | * | 11/2004 | Boutillier | 525/71 |
| 7,488,774 | B2 | * | 2/2009 | Berti et al. | 525/53 |

FOREIGN PATENT DOCUMENTS

| EP | 0 400 479 | | 12/1990 |
|---|---|---|---|
| WO | WO 9962975 A1 | * | 12/1999 |
| WO | 03 029317 | | 4/2003 |
| WO | WO 2004005361 A1 | * | 1/2004 |

OTHER PUBLICATIONS

U.S. Appl. No. 11/720,677, filed Jun. 1, 2007, Chiezzi, et al.

* cited by examiner

*Primary Examiner* — Vasu Jagannathan
*Assistant Examiner* — Mark S Kaucher
(74) *Attorney, Agent, or Firm* — Oblon, Spivak, McClelland, Maier & Neustadt, L.L.P.

(57) ABSTRACT

A process for the preparation of vinylaromatic (co)polymers grafted on an elastomer in a controlled way, comprising the dissolving of an elastomer, such as polibutadiene, in a mixture consisting of a monomer and of a solvent in the presence of a polymerization catalytic system, which comprises an initiator of free radicals and a stable initiator of free radicals. The mixture obtained in this way is heated to a temperature of about 100° C. to functionalize the rubber, then more monomer is added and the temperature is raised to start the polymerization reaction.

22 Claims, No Drawings

PROCESS FOR THE PREPARATION OF VINYLAROMATIC (CO)POLYMERS GRAFTED ON AN ELASTOMER IN A CONTROLLED WAY

The present invention refers to a process for the preparation of vinylaromatic (co)polymers grafted on an elastomer in a controlled way.

In detail, the present invention refers to a process for the preparation of (co)polymers of styrene grafted on an elastomer in presence of a living radicalic polymerization system.

The term "living radicalic polymerization", as used in the present description and in the claims, means a conventional radicalic polymerization carried in also in the presence of a chemical substance capable to react in a reversible way with the radical of the growing polymer chain. Such substance consists, for instance, of stable nitroxides or alkoxy-amines. More details on the radicalic polymerization can be found in the U.S. Pat. No. 4,581,429, in the European Patent 869,137 or in "Living Free Radical Polymerization", TPoint 2-2002, Notiziario di EniTecnologie (San Donato Milanese).

Various processes for the preparation of vinylaromatic (co) polymers grafted on elastomer in a controlled way are known in literature. For instance, in U.S. Pat. No. 6,262,179 a process to prepare a rubber reinforced vinylaromatic polymer is described, characterized by a mono- or bimodal morphology that comprises the polymerization of a vinylaromatic monomer solution containing rubber, by means of an initiator system that comprises a stable generator of radicals. At the end of the polymerization a product is obtained, consisting of a rigid polymer matrix, in which the rubber particles are dispersed, whose morphology, however, is still linked to the type of rubber used as in the traditional processes that use the non stable polymerization initiators.

U.S. Pat. No. 6,255,402 describes a process for the preparation of a composition consisting of a vinylaromatic matrix polymer, in which particles of rubber are dispersed with morphology different from the one known as "salami", but instead being of the "labyrinth", "onion" or, better, "capsule" type, so as to supply a crash resistant end product with improved gloss. The same US patent gives indications about meaning of the terms identifying the above cited morphologic forms.

The present process is characterized in that of being successful in obtaining the morphologic diversity using the homopolymer of the butadiene as rubber which, traditionally, substantially gives the morphology to salami.

According to said US patent the polybutadienic rubber is dissolved in a solvent in absolute absence of monomer and functionalized with an initiator system consisting of a traditional radical initiator, for instance a peroxide, and a stable radical initiator, for instance 2,2,6,6-tetramethyl-1-pyperidinyloxyl (commonly known as TEMPO) operating at a temperature comprised between 50 and 150° C., which was stirred for some hours. Finally, the vinylaromatic monomer is added and then its polymerization is started until the desired conversion is obtained.

The polymerization system of U.S. Pat. No. 6,255,402 permits on one hand to obtain an end product of variable morphology with a low cost rubber and on the other hand introduces a second disadvantage which reduces, or even runs the risk of canceling, the associate economic advantage of using the polybutadienic rubber. Indeed, in the solution processes, there is the provision for a stage of devolatilization under vacuum to retrieve at the end of the polymerization the solvent and the non reacted monomer which, for economic reasons, must be recycled. The above implies, for the processes of the current art, one stage to separate the solvent, recycled at the rubber functionalization, from the monomer recycled at the polymerization reactor, with an increase of the production costs.

The Applicant has now found a process for the preparation of vinylaromatic (co)polymers grafted on an elastomer in a controlled way, by means of a catalytic system comprising a stable initiator of radicals, which permits to obtain an end product in which the morphology of the dispersed elastomeric phase does not necessarily depend on the type of the used elastomer, as the latter could even consist of simple polybutadiene, and in which the not reacted end product, recovered after devolatilization, does not have to be separated in its single constituents (solvent and monomer) but can be used and recycled as such.

Therefore, the scope of the present invention is a process for the preparation of vinylaromatic (co)polymers grafted on elastomer in a controlled way which comprises:

a) dissolving an elastomer in a liquid phase consisting of a vinylaromatic monomer/polymerization solvent mixture with a weight ratio comprised between 60/40 and 100/0, preferably between 60/40 and 90/10;

b) adding to the solution a catalytic system of polymerization consisting of a free radical initiator (G), having F functionality, capable of withdrawing a proton from the polymeric chain of the elastomer and a stable initiator of free radicals comprising the group =N—O. (I), with molar ratios I/G·F lower than 4, preferably between 1 and 2, being F equal to the number of functional groups per molecule of the initiator which, by decomposition, produces two free radicals;

c) heating, while stirring, the mixture obtained in stage (b) at a temperature comprised between 80 and 110° C., for a time sufficient to obtain the complete functionalization of the elastomer;

d) feeding the vinylaromatic monomer to the mixture, containing in solution the functionalized elastomer, polymerizing the thus obtained mixture at a temperature greater than or equal to 120° C., preferably between 120 and 200° C.;

e) recovering the obtained vinylaromatic polymer obtained at the end of the polymerization, submitting it also to devolatilization under vacuum, to recover the solvent and the unreacted monomer; and f) recycling the solvent/monomer mixture to stage (a).

According to the present invention, the process of preparation of the vinylaromatic polymer can be realized via batch processing or via continuous processing. In the first case, the functionalization of the elastomer and the polymerization of the monomer occur in a single container, for instance in an agitated mixer equipped with heating systems from which the polymerization mixture is collected to recover the final polymer to be submitted to the phase of devolatilization when the solid content has reached a level comprised between 60 and 80% in weight. In the second case, instead, the functionalization of the elastomer takes place in the stirred mixer, continuously feeding products and additives, while the polymerization takes place in one or more stirred reactors, chosen among the stirred containers, such as the CSTR (Continuous Stirred Tank Reactor), and/or the tubular reactors (Plug Flow), continuously fed with the functionalized solution. Also, in this second case, the recovery of the final polymer takes place through the phase of devolatilization after the solid content reaches the above mentioned levels. The preferred process according to the present invention is the continuous process described, for instance, in the European Patent EP 400.479.

The term "vinylaromatic (co)polymer", as used in the present description and in the claims, means essentially a (co)polymer obtained from the (co)polymerization of at least one monomer that corresponds to following general formula (II):

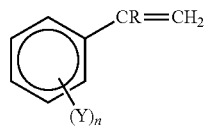

in which R is a hydrogen or a methyl group, n is zero or an integer comprised between 1 and 5 and Y is a halogen, like chlorine or bromine, or an alkylic or alkoxy radical having from 1 to 4 carbon atoms.

Examples of vinylaromatic monomers having the above identified general formula are: styrene, a-methylstyrene, methylstyrene, ethyl styrene, butyl styrene, dimethyl styrene, mono-, di-, tri-, tetra- and penta-chlorostyrene, bromo-styrene, metoxystyrene, acetoxystyrene, etc. The preferred vinylaromatic monomers are styrene and/or α-methylstyrene.

The vinylaromatic monomers of general formula (I) can be used alone or in a mixture up to 50% in weight with other monomers that can be copolymerizable. Examples of such monomers are the (meth)acrylic acid, the alkyl esters $C_1$-$C_4$ of (meth)acrylic acid like methyl acrylate, methylmethacrylate, ethyl acrylate, ethylmethacrylate, isopropyl acrylate, butyl acrylate, the amides and the nitriles of the (meth)acrylic acid like acrylamide, methacrylamide, acrylonitrile, methacrylonitrile, butadiene, ethylene, divinylbenzene, maleic anhydride, etc. The preferred copolymerizable monomers are acrylonitrile and methylmethacrylate.

Any elastomer that can be used as a reinforcing product in a vinylaromatic (co)polymer can be used in the process object of the present invention. However, the preferred product, for its economic convenience, is the homopolymer polybutadiene with a numerical medium molecular weight (Mn) comprised between 50,000 and 350,000 and a medium ponderal molecular weight (Mw) comprised between 100,000 and 500,000.

Other elastomers that can be used in place of polybutadiene or in a mixture with it can be chosen among the homopolymers and the copolymers of 1,3-alkadienes containing 40-100% in weight of the 1,3-alkadiene monomer, for instance butadiene, isoprene or pentadiene, and 0-60% in weight of one or more monoethylenically unsaturated monomers chosen among styrene, acrylonitrile, a-methylstyrene, methylmetacrylate and ethylacrylate.

Co-polymer examples of 1,3-alkadienes are the block co-polymers styrene-butadiene like the bi-block linear elastomers of the S-B type where S represents a polystyrenic block of medium molecular weight Mw comprised between 5,000 and 80,000 while B represents a polybutadienic block of medium molecular weight Mw comprised between 2,000 and 250,000. In these elastomers the amount of block S is comprised between 10 and 50% in weight with respect to the total of the rubber S-B. The preferred product is the styrene-butadiene copolymer block having a styrene content equal to 40% in weight and a viscosity in solution, measured at 23° C. in a 5% solution in weight of styrene, comprised between 35 and 50 CPS.

Other elastomer examples that can be used in the process object of the present invention are those described in the European Patent 606.931.

The previously described elastomers are dissolved in the liquid phase containing the monomer and a polymerization solvent. The preferred solvent, according to the present invention, is ethyl benzene, but other aromatic solvents can be used, like toluene or xylenes, or the aliphatic solvents, such as hexan or cyclohexan.

The catalytic system of polymerization is added to the solution prepared in said manner, in an amount comprised between 0.02 and 0.5% in weight with respect to the total. This system consists of a free radical initiator and of a stable initiator of free radicals with the previously indicated ratios. Surprisingly, there is not a substantial formation of polymer which, if formed, does not exceed 2% in weight, and no reticulation of the elastomer is observed during the functionalization phase.

The free radical initiators capable of withdrawing one proton from the polymer chain of the elastomer are chosen among the azo-derivates, such as the 4,4'-bis-(diisobutyrronitrile), 4,4'-bis(4-cyanopentanoic acid), 2,2'-azobis(2-amidinopropane) dihydrochloride, etc, or among the peroxides, the hydroperoxides, the percarbonates, the peresters and the persalts, for instance the persulphates such as the potassium persulphate or the ammonium persulphate. In general, the preferred free radicals initiators are the peroxides chosen among t-butyl isopropyl monoperoxycarbonate, t-butyl 2-ethylsilyl monoperoxycarbonate, dicumyl peroxide, t-butyl peroxide, 1,1-di(t-butylperoxy)cyclohexane, 1,1-di(t-butylperoxy)-3,3,5-trimethylcyclohexane, t-butylperoxyacetate, cumyl t-butyl peroxide, t-butyl peroxybenzoate and t-butyl peroxy-2-ethylhexanoate.

The stable initiator of free radicals characterized by the group =N—O is chosen among those of general formula (III):

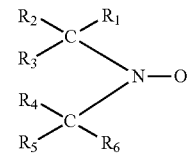

where the groups $R_1$, $R_2$, $R_5$ and $R_6$, equal or different from each other, are straight or branched alkyl radicals, substituted or unsubstituted, containing from 1 to 20 atoms of carbon or alkylaromatic radicals, in which the alkyl group contains from 1 to 4 carbon atoms while the $R_3$ and $R_4$ groups, equal or different from each other, are equal to R1, R2, R5 and R6, or R3-CNC-R4 is part of a cyclic structure, for instance with 4 or 5 carbon atoms, possibly fused with an aromatic ring or with a saturated ring containing from 3 to 20 carbon atoms in which at least a hydrogen atom of the cyclic structure can be replaced by a hydroxyl group.

According to a further embodiment of the present invention, the group =N—O. is replaced by the group group =N—O—R' wherein R' is a $C_1$-$C_6$ alkyl or $C_7$-$C_{12}$ arylalkyl radical, possibly containing at least one heteroatom. Examples of radical R' are 2-phenylethyl or 2-methyl-2-cyanopropyl radical.

Initiators of general formula (III) and their preparation are described in U.S. Pat. No. 4,581,429. Examples of particularly preferred initiators of general formula (III) that can be used in the process object of the present invention are the 2,2,5,5-tetramethyl-1-pyrrolidinyloxyl, known with the trade name PROXYL, the 2,2,6,6-tetramethyl-1-pyperinediny-loxyl, known with the trade name TEMPO, and the 4-hydroxy-2,2,6,6-tetramethyl-1-pyperinediniloxyl, known with the trade name 4OH-TEMPO. Other examples of stable initiators that can be used in the process object of the present invention and that are comprised in the general formula (III) are described in the above mentioned U.S. Pat. No. 4,581,429.

At the end of the functionalization of the elastomer, the process of polymerization of vinylaromatic (co)polymers grafted on elastomer proceeds like the traditional process of the known technique, by feeding the monomer and starting the polymerization reaction by increasing the temperature in one or more stages. At the end of the polymerization, the polymer is submitted to a devolatilization process to recover the not reacted monomer and the solvent, which are found to be in such a ratio as to allow their recycling to the mixer without having to separate one from the other. If a comonomer is present, it can be recovered, e.g. by distillation, before the recycling.

To better understand the present invention and to put it in practical use some non limitative examples are illustrated below.

EXAMPLE 1

Salami

In a 1 liter flat bottom autoclave, complete with a temperature recorder and a stirring system consisting of an anchor and of a turbine with six slanted blades (the distance between the walls of the autoclaves and the anchor being 5.5 millimeters), at ambient temperature, 60 g of ethylbenzene (ET), 160 g of styrene monomer (S) (ratio S/ET=73/27) and 50 g of polybutadiene INTENE 60 (Mw=308,600, polydispersivity 2.13) are introduced. The stirring speed is set at 100 rpm. The temperature of the system is raised to 90° C. in an hour and maintained constant for another hour. After that, 0.4840 g of benzoyl peroxide (BPO) and 0.5160 g of 4-2,2,6,6-tetramethyl-1-pyperidinyloxyl (4OH-TEMPO) are added. The temperature is raised to 105° C. in three hours and maintained constant for another two hours.

550 g of styrene monomer are added to the reaction mixture and the mixture is then heated to 125° C. in 45 minutes. The temperature is maintained at this value for six hours. After that, the reaction mixture is transferred into an appropriate container and the polymerization is completed by heating the mixture to 150° C. for four hours. Finally, the obtained polymer is devolatilized at 230° C. under vacuum to eliminate the ethylbenzene and the not reacted styrene. The ethylbenzene and the styrene in an S/ET weight ratio equal to 73/27 are recycled to the 1 liter autoclave without having to be separated.

The properties of the obtained polymer are indicated in Table 1.

EXAMPLE 2

Labyrinth

In a flat bottom 1 liter autoclave, complete with a temperature recorder and a stirring system consisting of an anchor and a turbine with six slanted blades (the distance between the walls of the autoclaves and anchor being 5.5 millimeter), at ambient temperature, 54 g of ethylbenzene, 126 g of styrene monomer (S/ET=70/30) and 45 g of polybutadiene INTENE 60 (Mw=308,600 polidis-persita 2.13) are introduced. The stirring speed is set at 100 rpm. The temperature of the system is taken to 90° C. in an hour and maintained constant for another hour. Afterwards, 0.8704 g of benzoyl peroxide (BPO) and 0.9280 g of 4OH-TEMPO are added. The temperature is increased to 105° C. in three hours and maintained constant for further two hours.

500 g monomer styrene are added to the reaction mixture and heated to 125° C. in 45 minutes. The temperature is maintained at said value for six hours. The reaction mixture is then transferred into a suitable container and the polymerization is completed by heating the mixture to 150° C. for four hours. Finally, the obtained polymer is devolatilized at 230° C. under vacuum to eliminate the ethylbenzene and the not reacted styrene. These last ones in a weight ratio S/ET equal to 70/30 are recycled to the 1 liter autoclaves without having to be separated.

The properties of the obtained polymer are shown in Table 1.

EXAMPLE 3

Giant Onions

In a 1 liter flat bottom autoclave, complete with a temperature recorder and a stirring system consisting of an anchor and one turbine with six slanted blades (with distance between the walls of the autoclaves and the anchor of 5.5 millimeter), at ambient temperature, 55 g of ethylbenzene, 127 g of styrene monomer (S/ET 70/30) and 45 g of polybutadiene INTENE 40 (Mw=225,548 polydispersivity 2.17) are introduced. The stirring speed is set at 100 rpm. The temperature is increased to 90° C. in an hour and maintained constant for another hour. Afterwards 1.1910 g of benzoyl peroxide (BPO) and 1.2697 g of 4OH-TEMPO are added. The temperature is raised to 105° C. in three hours and maintained constant for further two hours.

500 g of styrene monomer are added to the reaction mixture and heated to 125° C. in 45 minutes. The temperature is maintained at this value for six hours. Afterwards the reaction mixture is transferred into a suitable container and the polymerization is completed by heating the mixture to 150° C. for four hours. Finally, the obtained polymer is devolatilized at 230° C. under vacuum to eliminate the ethylbenzene and the not reacted styrene. These last ones in a weight ratio S/ET equal to 70/30 are recycled to the 1 liter autoclave without having to be separated.

The properties of the obtained polymer are shown in Table 1.

EXAMPLE 4

Capsules

In 1 liter flat bottom autoclave complete with a temperature recorder and a stirring system consisting of an anchor and a turbine with six slanted blades (with distance between the walls of the autoclaves and the anchor of 5.5 millimeter), at ambient temperature, 55 g of ethylbenzene, 127 g of styrene monomer (S/ET=70/30) and 45 g of polybutadiene INTENE 40 (Mw=225,548 polydispersivity 2.17) are introduced. The stirring speed is set at 100 rpm. The temperature of the system is increased to 90° C. in an hour and maintained constant for another hour. Afterwards 0.5955 g of benzoyl peroxide (BPO) and 0.6349 g of 4OH-TEMPO are added. The temperature is increased to 105° C. in three hours and maintained constant for further two hours.

500 g of styrene monomer are added to the reaction mixture and heated to 125° C. in 45 minutes. The temperature is maintained at this value for six hours. Afterwards the reaction mixture is transferred into a suitable container and the polymerization is completed by heating the mixture at 150° C. for four hours. Finally, the obtained polymer is devolatilized at 230° C. under vacuum to eliminate the ethylbenzene and the not reacted styrene. These last ones in an S/ET weight ratio equal to 70/30 are recycled to the 1 liter autoclave without having to be separated.

The properties of the obtained polymer are shown in Table 1.

TABLE 1

|  | Mw Polymer | Morphology | Particles Diameter |
|---|---|---|---|
| EXAMPLE 1 | 214'000 | SALAMI | ~0.25 μm |
| EXAMPLE 2 | 195'000 | LABYRINTH | ~2.0 μm |
| EXAMPLE 3 | 93'000 | GIANT ONIONS | ~1.5 μm |
| EXAMPLE 4 | 129'000 | CAPSULES | ~1.0 μm |

The invention claimed is:

1. A process for the preparation of vinylaromatic (co)polymers grafted on an elastomer in controlled way, comprising:
   a) dissolving an elastomer in a liquid phase comprising a mixture of a first amount of a vinylaromatic monomer and a polymerization solvent to form a solution, wherein a weight ratio of the vinylaromatic monomer to the polymerization solvent in the solution is between 60/40 and 100/0;
   b) adding to the solution a catalytic system of polymerization comprising a free radical initiator (G) with functionality F capable of withdrawing a hydrogen atom from the polymer chain of the elastomer and a stable initiator of free radicals comprising the group =N—O(I), with a molar ratio I/G·F lower than 4;
   c) heating under agitation the mixture obtained in stage (b) at a temperature between 80 and 110° C., for a time sufficient to obtain the complete functionalization of the elastomer;
   d) feeding a second amount of the vinylaromatic monomer to the mixture, containing in solution the functionalized elastomer, and polymerizing the thus obtained mixture at a temperature equal to or greater than 120° C.;
   e) recovering the vinylaromatic polymer obtained at the end of the polymerization, and submitting the vinylaromatic polymer to devolatilization under vacuum, to recover the solvent and the not reacted monomer; and
   f) recycling the solvent/monomer mixture to stage (a).

2. The process according to claim 1, wherein the elastomer is the homopolymer polybutadiene with a numerical mean molecular weight (Mn) between 50,000 and 350,000 and a mean ponderal molecular weight (Mw) between 100,000 and 500,000.

3. The process according to claim 1, wherein the catalytic polymerization system is added in an amount between 0.02 and 0.5% in weight relative to the total.

4. The process according to claim 1, wherein the initiator of free radicals capable of withdrawing a hydrogen atom from the polymer chain of the elastomer is selected from the group consisting of nitro derivatives, peroxides, hydroperoxides, percarbonates, peresters and persalts.

5. The process according to claim 1, wherein the stable initiator of free radicals is of formula (III):

$$\begin{array}{c} R_2 \diagdown \diagup R_1 \\ R_3 \diagup C \diagdown \\ \phantom{R_3 \diagup C} N\!-\!O \\ R_4 \diagdown \diagup \\ R_5 \diagup C \diagdown R_6 \end{array} \quad (III)$$

where the groups $R_1$, $R_2$, $R_5$ and $R_6$, equal or different from each other, are straight or branched alkyl radicals, substituted or unsubstituted, containing from 1 to 20 atoms of carbon or alkylaromatic radicals, in which the alkyl group contains from 1 to 4 carbon atoms while the groups $R_3$ and $R_4$, equal or different from each other, are equal to $R_1$, $R_2$, $R_5$ and $R_6$; or $R_3$—CNC—$R_4$ is part of a cyclic structure.

6. The process according to claim 5, wherein the stable initiator of free radicals is selected from the group consisting of 2,2,5,5-tetramethyl-1-pyrrolidinyloxyl, (PROXYL), 2,2,6,6-tetramethyl-1-pyperidinyloxyl, (TEMPO), and 4-hydroxy-2,2,6,6-tetramethyl-1-pyperidinyloxyl (4OH-TEMPO).

7. The process according to claim 1, wherein the liquid phase consists of the vinylaromatic monomer and the polymerization solvent and the catalytic system consists of the free radical initiator (G) with functionality F capable of withdrawing a hydrogen atom from the polymer chain of the elastomer and of a stable initiator of free radicals comprising the group =N—O(I).

8. The process according to claim 1, wherein the feeding and polymerizing d) is carried out a temperature of 120-200° C.

9. The process according to claim 5, wherein the cyclic structure is fused with at least one of an aromatic ring and a saturated ring containing from 3 to 20 carbon atoms in which at least a hydrogen atom of the cyclical structure is replaced by a hydroxyl group.

10. The process according to claim 1, wherein the aromatic monomer is styrene and the polymerization solvent comprises ethylbenzene.

11. The process according to claim 10, wherein the elastomer is a polybutadiene.

12. The process according to claim 1, wherein at least the heating (c) and the polymerizing (d) are carried out in a single container.

13. The process according to claim 1, wherein the molar ratio I/G·F is from 1 to 2.

14. The process according to claim 1, wherein the elastomer is completely functionalized with the free radical initiator (G) to form a stable radical before the second amount of the vinylaromatic monomer is fed to the mixture.

15. The process according to claim 1, wherein the stable initiator is 2,2,6,6-tetramethyl-1-pyperidinyloxyl.

16. The process according to claim 15, wherein the free radical initiator is benzoyl peroxide.

17. The process according to claim 1, wherein the radical initiator is added only during step b).

18. The process according to claim 1, wherein the radical initiator is added to the elastomer only in the presence of the vinylaromatic monomer.

19. The process according to claim 1, wherein the vinyl aromatic polymer comprises one or more random copolymeric units.

20. The process according to claim 5, wherein the stable initiator of free radicals is obtained from a compound of formula (III) wherein the =N—O group is a group =N—O—R' wherein R' is a $C_1$-$C_8$ alkyl or $C_7$-$C_{12}$ arylalkyl radical.

21. The process according to claim 20, wherein radical R' is 2-phenylethyl or 2-methyl-2-cyanopropyl.

22. The process according to claim 20, wherein R' contains at least one heteroatom.

* * * * *